April 14, 1925.　　　　　　　　　　　　　　　　　1,533,609
F. B. PFEIFFER
METHOD OF MANUFACTURING TUBE PROTECTORS
Filed Oct. 27, 1923
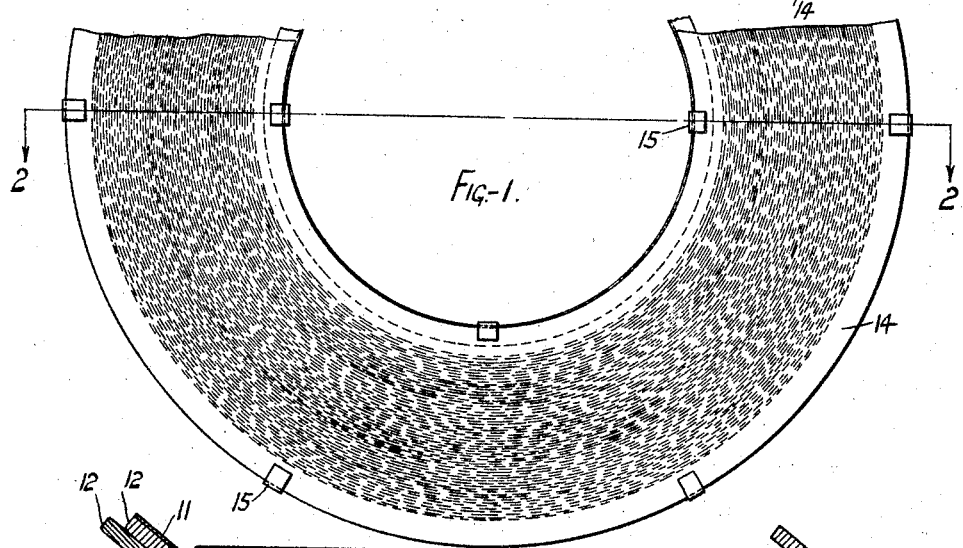
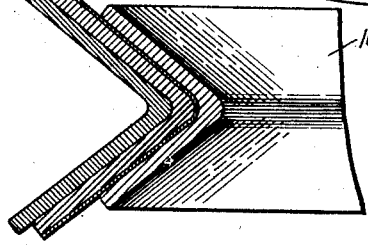
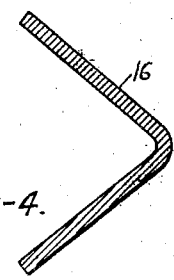
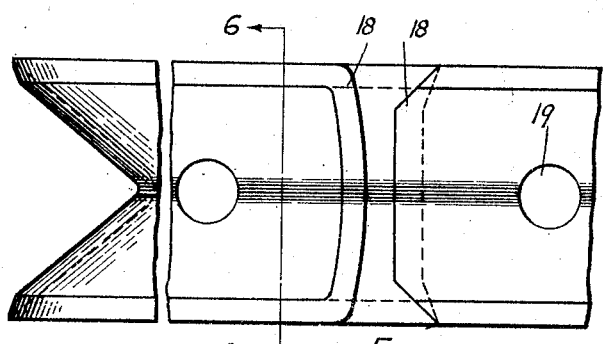
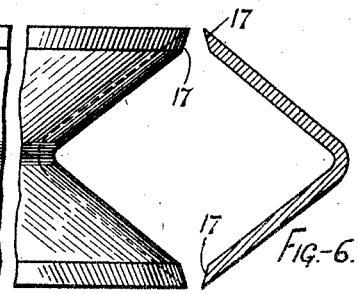
Inventor
FRED B. PFEIFFER.

Patented Apr. 14, 1925.

1,533,609

UNITED STATES PATENT OFFICE.

FRED BROWN PFEIFFER, OF AKRON, OHIO, ASSIGNOR TO THE STAR RUBBER COMPANY, OF AKRON, OHIO, A CORPORATION OF OHIO.

METHOD OF MANUFACTURING TUBE PROTECTORS.

Application filed October 27, 1923. Serial No. 671,083.

*To all whom it may concern:*

Be it known that I, FRED BROWN PFEIFFER, a citizen of the United States, and a resident of Akron, county of Summit, State of Ohio, have invented certain new and useful Improvements in Methods of Manufacturing Tube Protectors, of which the following is a specification.

This invention relates to the manufacture of tube protectors or tire flaps which are designed to be placed within the tire casing between the beads of the tire to protect the tube from pinching beneath the beads and from contact with the rim. The present invention relates to an improved method of manufacturing tire flaps, whereby they are made more rapidly and economically than in prior practices.

In the drawings:

Figure 1 is a side view of a roll of protector material in the apparatus or mold in which it is vulcanized;

Figure 2 is a section on the line 2—2 of Figure 1;

Figure 3 is an enlarged section taken through the base of the curing ring;

Figure 4 is a section of the flap material as it is cured;

Figure 5 is a view of the completed flap; and

Figure 6 is a section on the line 6—6 of Figure 5.

The tube protector differs from protectors formerly made in that it is preferably composed wholly of rubber and is of substantially even thickness throughout, except along its edges where it is skived or beveled so that its surface merges with the inner surface of the casing without leaving any sharp edges on which the tube may cut.

The protector is made from a strip of rubber formed in any suitable way, which is wound upon a form such as shown in Figures 1, 2 and 3. This form comprises a central ring or core member 10 which is angular in cross section so as to give a generally angular formation or longitudinal valley to the flap. The ring 10 is provided with a metallic strip 11 of the width of the finished protector and on this may be placed a suitable number of filler strips 12. This structure, shown in detail in Figure 3, is the base on which the material is wound, and the showing of the apparatus is for the sake of explaining the invention, as other forms or rings may be devised which will work satisfactorily.

The rubber strip is wound about the form for a large number of convolutions which are shown in Figures 1 and 2. As the material is of even thickness throughout, the flap material does not build up in the center, an action which is present in other flap material where the thickened area in the center of the flap causes the center or valley of the flap material to gradually fill up until the depression is entirely lost. By the use of the method of manufacture as I have described it, this objectionable result is not present and the outside layers of the rubber stock are of the same shape as the inner layers. A correspondingly larger body of the material may thus be assembled as shown in Figures 1 and 2.

When the drum or form is filled up as far as desired, the outer layer may be wrapped in any suitable way and side plates 14 may be placed on either side of the flap material and held in position by clips 15. The assembled drum and material are then vulcanized in the well known manner.

When the vulcanization is complete, the protector strip 16 is in the form shown in Figure 4 and of even thickness throughout. The edges of the protector strip are then cut away or skived as shown at 17—17 so as to bring the strip to a feather edge. The protectors are then cut to the proper length, the ends skived off as at 18—18 and the valve holes 19 punched therein. The protector is now complete and ready for use in the tire casing.

In carrying out the process of the present invention it is not essential that the order of the steps be adhered to, nor is it necessary that rubber, exclusively, be used in the manufacture of the flap as the presence of fabric or other material to a greater or less degree would not affect the essential steps of the process.

What I claim is:

1. The method of manufacturing tube protectors, comprising forming a length of rubber of even thickness throughout, wrapping the rubber about a ring substantially V-shape in cross section, curing the rubber while upon the ring whereby it is given a circumferential curvature and a circumferential valley, skiving the edges of the strip, and cutting protectors therefrom, 2. The method of manufacturing tube protectors, comprising forming a length of rubber of even thickness throughout, curing the rubber length in substantially V-shape in cross section whereby it is given a longitudinal valley, skiving the edges of the rubber strip thus formed, and cutting protectors therefrom.

3. The method of manufacturing tube protectors, comprising forming a length of rubber of even thickness, vulcanizing the rubber, skiving the edges, and then cutting protectors from the strip of skived rubber thus formed.

4. The method of manufacturing tube protectors, comprising forming a length of rubber of even thickness, vulcanizing the rubber upon a circular form whereby it is given a circumferential curvature, skiving the edges of the rubber strip thus formed, and cutting protectors therefrom.

5. The method of manufacturing tube protectors, comprising forming a length of rubber of even thickness, vulcanizing the rubber upon a circular form and with a longitudinal depression throughout its entire length, skiving the edges of the rubber strip thus formed, and cutting protectors therefrom.

FRED BROWN PFEIFFER.